United States Patent
Taniuchi et al.

(10) Patent No.: US 12,160,019 B2
(45) Date of Patent: Dec. 3, 2024

(54) BATTERY MODULE AND BATTERY PACK

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 917 days.

(21) Appl. No.: 17/281,237

(22) PCT Filed: Oct. 1, 2018

(86) PCT No.: PCT/JP2018/036696
§ 371 (c)(1),
(2) Date: Nov. 15, 2021

(87) PCT Pub. No.: WO2020/070773
PCT Pub. Date: Apr. 9, 2020

(65) Prior Publication Data
US 2022/0109216 A1 Apr. 7, 2022

(51) Int. Cl.
*H01M 50/509* (2021.01)
*H01M 10/613* (2014.01)
(Continued)

(52) U.S. Cl.
CPC ....... *H01M 50/509* (2021.01); *H01M 10/613* (2015.04); *H01M 10/647* (2015.04);
(Continued)

(58) Field of Classification Search
CPC ............ H01M 10/613; H01M 10/647; H01M 50/209; H01M 50/291; H01M 50/293;
(Continued)

(56) References Cited

U.S. PATENT DOCUMENTS

2005/0208374 A1 9/2005 Sakurai
2005/0231158 A1* 10/2005 Higashino ......... H01M 10/6561
320/112
(Continued)

FOREIGN PATENT DOCUMENTS

CN 1670985 A 9/2005
CN 106471666 A 3/2017
(Continued)

OTHER PUBLICATIONS

Machine Translation of the detailed description of JP 2005-166279A (Year: 2005).*

Primary Examiner — Gregg Cantelmo
(74) Attorney, Agent, or Firm — CKC & Partners Co., LLC

(57) ABSTRACT

This battery module is provided with a plurality of battery cells each comprising an all-solid battery having laminated therein a positive electrode layer, a negative electrode layer, and a solid electrolyte layer. Each of the battery cells has a pair of electrode terminals protruding from opposing lateral faces of the battery cell. The plurality of battery cells are arranged so as to be parallel to the lamination planes of the positive electrode layer, the negative electrode layer, and the solid electrolyte layer and in such a manner as to have the respective electrode terminals of different battery cells arrayed in parallel to each other. The electrode terminal and the electrode terminal of battery cells adjacent in the array direction are electrically connected by a bus bar.

6 Claims, 12 Drawing Sheets

(51) Int. Cl.
  *H01M 10/647* (2014.01)
  *H01M 50/209* (2021.01)
  *H01M 50/291* (2021.01)
  *H01M 50/293* (2021.01)
  *H01M 50/503* (2021.01)
  *H01M 50/51* (2021.01)
  *H01M 50/512* (2021.01)
  *H01M 50/548* (2021.01)
  *H01M 50/557* (2021.01)

(52) U.S. Cl.
  CPC ....... *H01M 50/209* (2021.01); *H01M 50/291* (2021.01); *H01M 50/293* (2021.01); *H01M 50/503* (2021.01); *H01M 50/51* (2021.01); *H01M 50/512* (2021.01); *H01M 50/548* (2021.01); *H01M 50/557* (2021.01); *H01M 2220/20* (2013.01)

(58) Field of Classification Search
  CPC .. H01M 50/503; H01M 50/509; H01M 50/51; H01M 50/512; H01M 50/548; H01M 50/557
  See application file for complete search history.

(56) References Cited

U.S. PATENT DOCUMENTS

| | | | |
|---|---|---|---|
| 2009/0297936 A1* | 12/2009 | Nemoto | H01M 50/227 429/152 |
| 2010/0025132 A1* | 2/2010 | Hill | H01M 50/249 180/68.5 |
| 2015/0180076 A1* | 6/2015 | Hasegawa | H01M 50/50 29/593 |
| 2018/0034107 A1 | 2/2018 | Wolter et al. | |

FOREIGN PATENT DOCUMENTS

| | | |
|---|---|---|
| JP | 2004022395 A | 1/2004 |
| JP | 2004047167 | 2/2004 |
| JP | 2004327081 | 11/2004 |
| JP | 2005166279 A | 6/2005 |
| JP | 2005268138 A | 9/2005 |
| JP | 2009211998 A | 9/2009 |
| JP | 2015115196 A | 6/2015 |
| JP | 2017521822 | 8/2017 |

* cited by examiner

Prior Art

BATTERY MODULE AND BATTERY PACK

TECHNICAL FIELD

The present invention relates to a battery module and a battery pack.

BACKGROUND ART

Generally, a battery cell such as a lithium ion secondary battery equipped to a vehicle such as a hybrid vehicle and battery car is configured by accommodating electrode plates and an electrolytic solution in a cell case of substantially rectangular parallelepiped shape. A pair of electrodes electrically connected with the electrode plates is arranged on the upper surface of the battery cell. As shown in FIG. 12, generally, the battery cell 101 is arranged so that the pair of electrode terminals 102 face upwards. The battery cell 101 has an explosion proof valve (not illustrated) for letting abnormal gas evolved inside to escape to outside, and configures so that this explosion proof valve is not blocked by the electrolytic solution. The battery module 100 is configured by laminating a plurality of these battery cells 101 in one direction. Adjacent electrode terminals 102, 102 (positive electrode and negative electrode) of adjacent battery cells 101, 101 are electrically connected by a bus bar 103 consisting of a metal plate, etc.

However, the battery cell expands by charging and discharging. For this reason, in a case of a plurality of battery cells being laminated as shown in FIG. 12, there is concern over interval between adjacent battery cells widening by expansion of the battery cells. If the interval between battery cells widened, stress acts on the bus bar or the connecting part between the bus bar and electrode terminal, and there is concern over breaking or the like. For this reason, a conventional battery module bind the entirety of the plurality of laminated battery cells, and configures so as to repress widening of the interval of battery cells occurring by expansion of the battery cell.

In addition, the battery cell generates heat from charging and discharging. For this reason, generally, the conventional battery module configures so as to cool each battery cell by a cooling medium, by arranging a cooling medium channel at the bottom surface (opposing surface of protruding surface of the electrode terminal) of the battery cell.

Patent Document 1: Japanese Unexamined Patent Application, Publication No. 2009-211998

DISCLOSURE OF THE INVENTION

Problems to be Solved by the Invention

Generally, considering the cell structure and assembly property, the electrode terminals of the battery cell are arranged on the upper surface of the battery cell, and thus the height of the battery module increases. As a result thereof, it becomes a factor whereby lowering of the height of the vehicle equipping this battery module is hindered.

In addition, the binding force for suppressing expansion of the plurality of battery cells is applied so as to oppose the lamination direction of the electrode layers within the battery cell. For this reason, the conventional battery module has a problem in that a plurality of the battery cells must be laminated in the same direction as the lamination direction of the electrode layers in order to enable binding a plurality of battery cells at once, and thus has a restriction in the arrangement of battery cells.

Furthermore, the cooling area of the battery cells is restricted to the bottom surface which is the farthest from the electrode terminals having the largest heating value, at the outside of the battery cell; therefore, the conventional battery module has a problem in that the cooling efficiency of battery cells is poor.

Therefore, the present invention has an object of providing a battery module which can suppress the height of the battery module to be low, can improve the degrees of freedom in arrangement of the battery cells, as well as can ensure a wide cooling area of the battery cells; and a battery pack configured from these battery modules.

Means for Solving the Problems

A battery module (for example, the battery module 1A, 1B, 1C described later) according to a first aspect of the present invention includes: a plurality of battery cells (for example, the battery cell 2 described later) consisting of a solid-state battery in which a positive electrode layer (for example, the positive electrode layer 201 described later), a negative electrode layer (for example, the negative electrode layer 202 described later) and solid electrolyte layer (for example, the solid electrolyte layer 203 described later) are laminated, in which the battery cell has a pair of electrode terminals (for example, the positive electrode terminal 23a, negative electrode terminal 23b described later) which respectively protrude from opposing lateral faces (for example, the lateral face 22 described later) of the battery cell, a plurality of the battery cells are parallel relative to lamination planes of the positive electrode layer, the negative electrode layer and the solid electrolyte layer, and arranged so that the electrode terminals of different battery cells are lined up, and the electrode terminals of the battery cells which are adjacent in an array direction are electrically connected by a bus bar (for example, the bus bar 3 described later).

According to the battery module as described in the first aspect, it is possible to suppress the height of the battery module to be low, improve the degrees of freedom in arrangement of the battery cells, as well as ensure a wide cooling area of the battery cells.

According to a second aspect of the present invention, in the battery module as described in the first aspect, a module group (for example, the module group 10 described later) may be configured by a plurality of the battery cells being arranged is laminated in plurality in a direction orthogonal to the lamination plane.

According to the battery module as described in the second aspect, it is possible to arrange the battery cells in higher density, while suppressing the height.

According to a third aspect of the present invention, in the battery module as described in the second aspect, it may be configured so that the bus bar is disposed between the electrode terminals of the battery cells which are adjacent in the lamination direction, the battery cells which are adjacent in the lamination direction are connected in parallel by the bus bar, and the electrode terminals of the battery cells which are adjacent in an array direction in the module group are connected in series by the bus bar which is common electrically connecting the battery cells which are adjacent in the lamination direction.

According to the battery module as described in the third aspect, it is possible to connect in parallel and series a plurality of battery cells by a small number of bus bars.

According to a fourth aspect of the present invention, in the battery module as described in the third aspect, the bus bars which are adjacent in the array direction of the battery cells may be integrally coupled by a coupling structural member (for example, the coupling structural member 6 described later) having an insulation property.

According to the battery module as described in the fourth aspect, the plurality of battery cells in the array direction form a structure integrally coupled by the bus bar 3 and the coupling structural member, and the arranging state of each battery cell is retained.

According to a fifth aspect of the present invention, in the battery module as described in any one of the first to fourth aspects, the electrode terminal may be formed in a flat plate shape which is parallel relative to the lamination plane.

According to the battery module as described in the fifth aspect, since the electrode terminals are flat plate shapes that are parallel relative to the lamination plane of the electrode layers, the height of the battery module will not rise from the electrode terminals, and can easily electrically connect adjacent electrode terminals.

According to a sixth aspect of the present invention, in the battery module as described in the fifth aspect, the bus bar may be formed in a flat plate shape which is parallel relative to the electrode terminal.

According to the battery module as described in the sixth aspect, since the bus bar is also a flat plate shape similarly to the electrode terminals, and parallel relative to the electrode terminals, the height of the battery module will not rise by the bus bar, and are easily and reliably capable of electrical connection of the electrode terminals and bus bar by bring plates into surface contact.

A battery pack (for example, the battery pack P1, P2 described later) according to a seventh aspect of the present invention a plurality of the battery modules as described in any one of the first to sixth aspects disposed in parallel relative to an array direction of the battery cells.

According to the battery pack as described in the seventh aspect, it is possible to obtain a battery pack configured from battery modules which can suppress the height of the battery module to be low, improve the degrees of freedom in arrangement of the battery cells, as well as ensure a wide cooling area of the battery cells.

According to an eighth aspect of the present invention, the battery pack as described in the seventh aspect may further include a cooling means (for example, the water jacket 4 described later) which cools the battery cell, in a lower surface side of the battery module.

According to the battery pack as described in the eighth aspect, it is possible to efficiently cool the battery cells of each battery module.

Effects of the Invention

According to the present invention, it is possible to provide a battery module which can suppress the height of the battery module to be low, can improve the degrees of freedom in arrangement of the battery cells, as well as can ensure a wide cooling area of the battery cells; and a battery pack configured from these battery modules.

PREFERRED MODE FOR CARRYING OUT THE INVENTION

Figure 1:
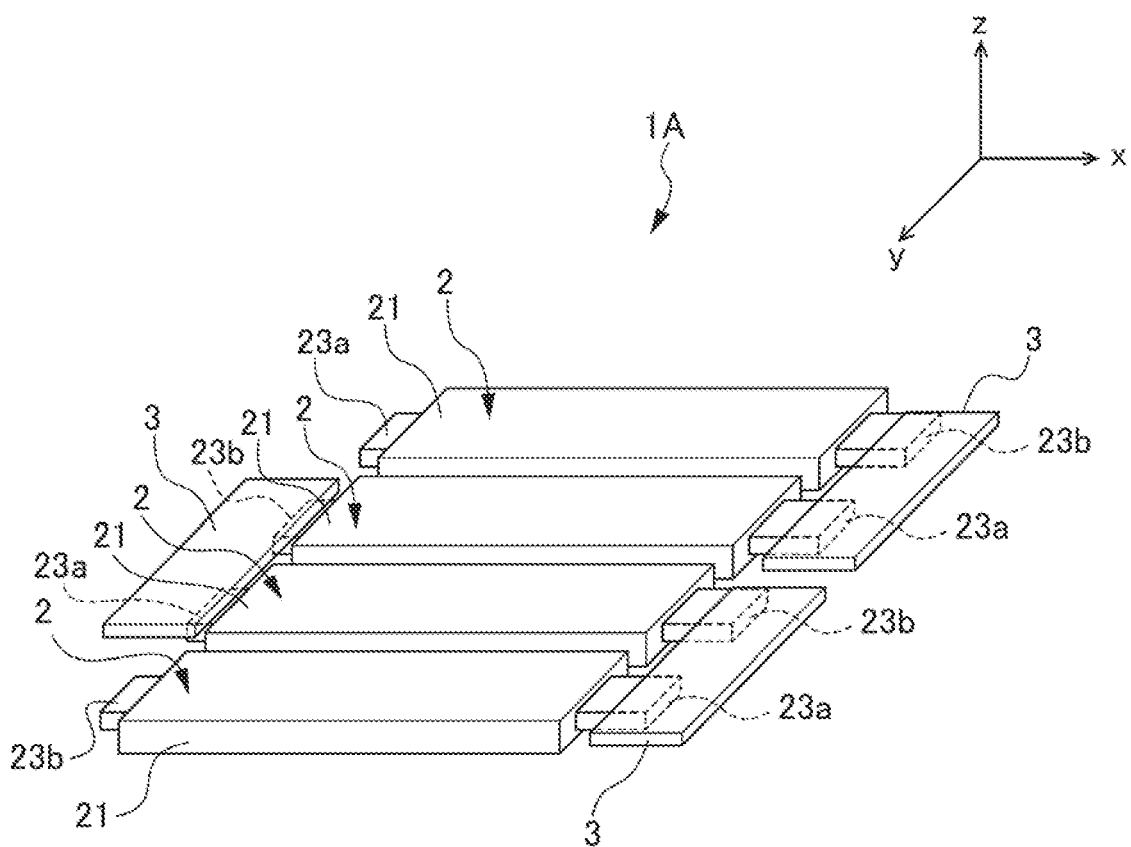
FIG. 1 is a perspective view showing a basic configuration of a battery module according to the present invention made by connecting in series a plurality of battery cells.

Hereinafter, an embodiment of the present invention will be explained by referencing the drawings. FIG. 1 is a perspective view showing a basic configuration of a battery module according to the present invention. A battery module 1A shown in FIG. 1 is configured by arranging four battery cells 2 in the y direction in the drawing. However, FIG. 1 is a view merely explaining the basic configuration of the battery module 1A, and the number of battery cells 2 is not limited to four so long as being a plurality. It should be noted that, in the directions in each drawing shown below, the respective directions of x, y, z indicate directions orthogonal to each other. The x direction indicates the width direction of the battery cell 2 (direction in which the pair of positive electrode terminal 23a and negative electrode terminal 23b described later protrude). The y direction indicates the array direction of the battery cells 2. The z direction indicates the thickness direction of the battery cells 2. In the present embodiment, the direction indicated by the z direction indicates a direction following the gravity direction.

Figure 2:
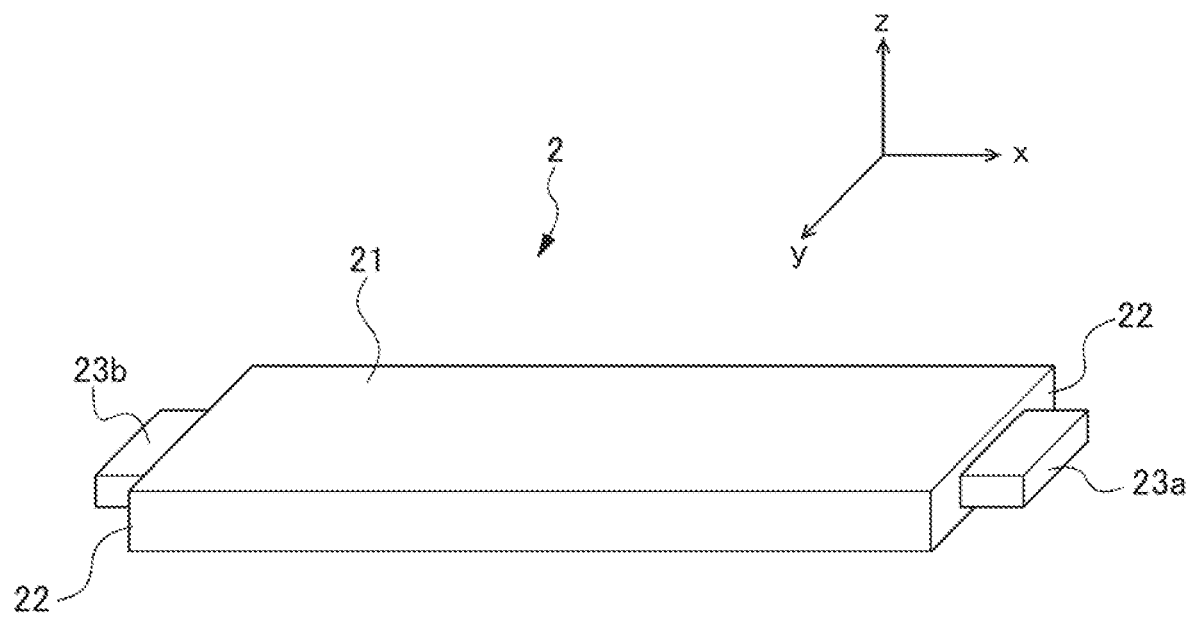
FIG. 2 is a perspective view showing an embodiment of a battery cell which can be used in the battery module according to the present invention.

The battery cell 2 shown in the present embodiment consists of a solid-state battery which does not contain an electrolytic solution, and accommodates an electrode plate 20 (refer to FIG. 3) within a cell case 21 of aluminum, aluminum alloy, or the like. As shown in FIG. 2, the cell case 21 is a rectangular parallelepiped box that is flat in the z direction. The cell case 21 shown in the present embodiment is formed in an elongated shape which is longer in the x direction than the y direction. At the opposing lateral face of the battery cell 2, i.e. at one lateral face 22 among two lateral faces 22, 22 arranged at both ends in the width direction (x direction) of the battery cell 2, a positive electrode terminal 23a is provided to protrude, and a negative electrode terminal 23b is provided to protrude at the other lateral face 22. The positive electrode terminal 23a and negative electrode terminal 23b are all tabular electrode terminals which are thin in the z direction formed by a metal member of copper or the like.

Figure 3:
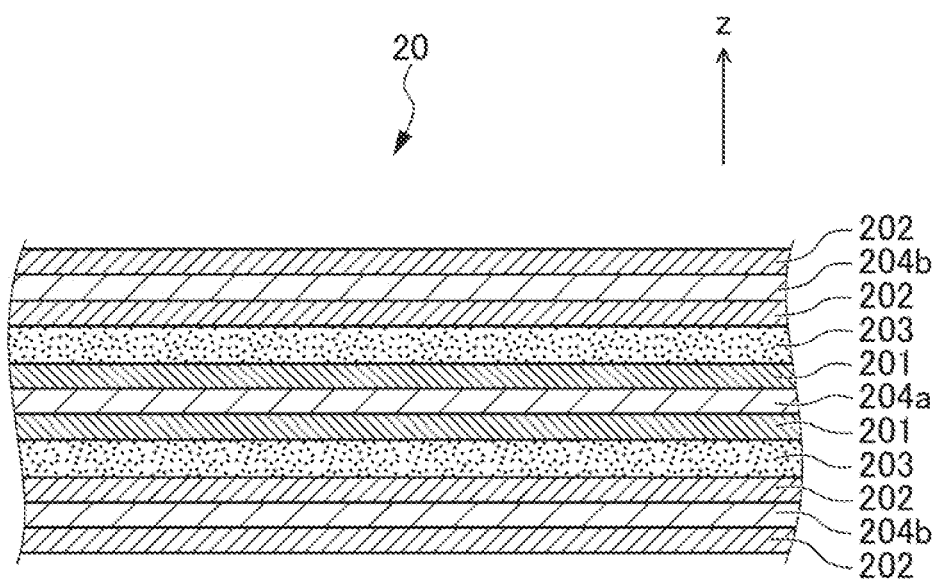
FIG. 3 is a cross-sectional view showing the structure of an electrode plate accommodated in the battery cell.

As shown in FIG. 3, the electrode plate 20 has a plurality of positive electrode layers 201, a plurality of negative electrode layers 202, a plurality of solid electrolyte layers 203, a plurality of positive current collectors 204a, and a plurality of negative current collectors 204b, and these are laminated and integrated along the z direction. The positive electrode layer 201 has a positive electrode active material, and is coated on both sides of the positive electrode current collector 204a. The negative electrode layer 202 has a negative electrode active material, and is coated on both sides of the negative electrode current collector 204b. The solid electrolyte layer 203 has a solid-state electrolyte having ion conductivity, and is interposed between the positive electrode layer 201 and negative electrode layer 202. The positive electrode current collector 204a and negative electrode current collector 204b consist of metal foil such as aluminum, copper or SUS. The electrode plate 20 configured from these respective layers is compressed in the z direction, by a predetermined load (initial load) being applied in the lamination direction. The compressed electrode plate 20 is accommodated in the cell case 21 together with an insulation bag, in a state accommodated in the insulation bag which is not illustrated.

The positive electrode terminal 23a and negative electrode terminal 23b protruding outside of the battery cell 2 are electrically connected to the positive electrode current collector 204a or negative electrode current collector 204b of the electrode plate 20. The positive electrode terminal 23a and negative electrode terminal 23b shown in the present embodiment are formed in a flat plate shape which is parallel to the lamination plane of the positive electrode layer 201, negative electrode layer 202 and solid electrolyte layer 203 of the electrode plate 20. In other words, the positive electrode terminal 23a and negative electrode terminal 23b are made a plate shape which is thin in the z direction. For this reason, combined with the entirety of the battery cells 2 being flat in the z direction, it is possible to suppress to the utmost the thickness (height in z direction) of the battery cells 2. Moreover, upon electrically connecting the positive electrode terminals 23a, negative electrode terminals 23b of adjacent battery cells 2, since it is possible to use the tabular surfaces of the positive electrode terminal 23a and negative electrode terminal 23b as electrically connecting surfaces, the electrical connection is easy.

It should be noted that the lamination plane of the positive electrode layer 201, negative electrode layer 202 and solid electrolyte layer 203 is each interface between the positive electrode layer 201, solid electrolyte layer 203 and positive electrode current collector 204a, and each interface between the negative electrode layer 202, solid electrolyte layer 203 and negative electrode current collector 204b. This lamination plane extends in the xy direction in FIG. 1, and extends in the left/right direction and a vertical direction relative to the paper plane of FIG. 3.

Four of the battery cells 2 are arranged so as to be parallel to the y direction, by aligning the array direction of the positive electrode terminal 23a and negative electrode terminal 23b in the x direction, as shown in FIG. 1. More specifically, the four battery cells 2 are arranged and lined up so as to be parallel relative to the lamination plane of the positive electrode layer 201, negative electrode layer 202 and solid electrolyte layer 203 of the electrode plate 20. The four battery cells 2 are arranged so that the positive electrode terminals 23a and negative electrode terminals 23b of different battery cells 2 align in the y direction. The positive electrode terminals 23a or negative electrode terminals 23b of four battery cells 2 are arranged on a straight line along the y direction.

The battery module 1A shown in FIG. 1 makes the orientation of the positive electrode terminal 23a and negative electrode terminal 23b of a battery cell 2 differ from the adjacent battery cells 2. In other words, the positive electrode terminals 23a and negative electrode terminals 23b of the four battery cells 2 are alternately arranged along the y direction. Then, the positive electrode terminals 23a and negative electrode terminals 23b of two battery cells 2, 2 which are adjacent in the array direction (y direction) are each respectively connected by one bus bar 3, whereby the four battery cells 2 are serially connected.

The bus bar 3 is formed in a thin flat plate shape by a metal material such as aluminum, stainless steel or copper. With the battery module 1A shown in FIG. 1, three bus bars 3 are arranged so as to be parallel relative to the positive electrode terminals 23a and negative electrode terminals 23b, and one is arranged to be laminated over the positive electrode terminal 23a and negative electrode terminal 23b of two adjacent battery cells 2, 2. The bus bar 3, for example, is fixed to the positive electrode terminal 23a and negative electrode terminal 23b by a solder connection, adhesion by a conductive adhesive, or fastening by a screw or the like, and electrically connect the positive electrode terminal 23a and negative electrode terminal 23b. To the positive electrode terminal 23a of one of battery cells 2, 2 at both ends in the y direction of the battery module 1A, and the negative electrode terminal 23b of the other one, a harness (not illustrated) and/or bus bar for connection with another battery module 1A or an external electrical circuit (not illustrated) is electrically connected.

According to the battery module 1A configured in this way, due to arranging so as to align a plurality of battery cells 2 which are flat in the z direction, it is possible to suppress the height of the battery module 1A to be low. Since the battery cell 2 consists of a solid state battery, there is no need to consider the orientation of the battery cells as in a battery cell containing electrolytic solution, and thus it is possible to improve the degrees of freedom in arrangement of the battery cells 2. Moreover, since the flat surface of the battery cell 2 (face perpendicular to the z direction shown in FIGS. 1 and 2) line up on one plane, it is possible to cool the battery cells 2 using this surface. Therefore, according to this battery module 1A, it is possible to ensure a wide cooling area of each battery cell 2. By the battery cell 2 being a flat shape, since the distance between the surface of the battery cell 2 serving as the cooling face and the positive electrode terminal 23a, negative electrode terminal 23b is close, the cooling efficiency is also raised.

In addition, the bus bar 3 shown in the present embodiment is tabular similarly to the positive electrode terminal 23a and negative electrode terminal 23b, and is configured so as to be parallel relative to this positive electrode terminal 23a and negative electrode terminal 23b; therefore, there is no concern over the height of the battery module 1a rising by the bus bar 3. Moreover, the bus bar 3, positive electrode terminal 23a and negative electrode terminal 23b are easily and reliably capable of electrical connection by bringing the plates into surface contact.

Figure 4:
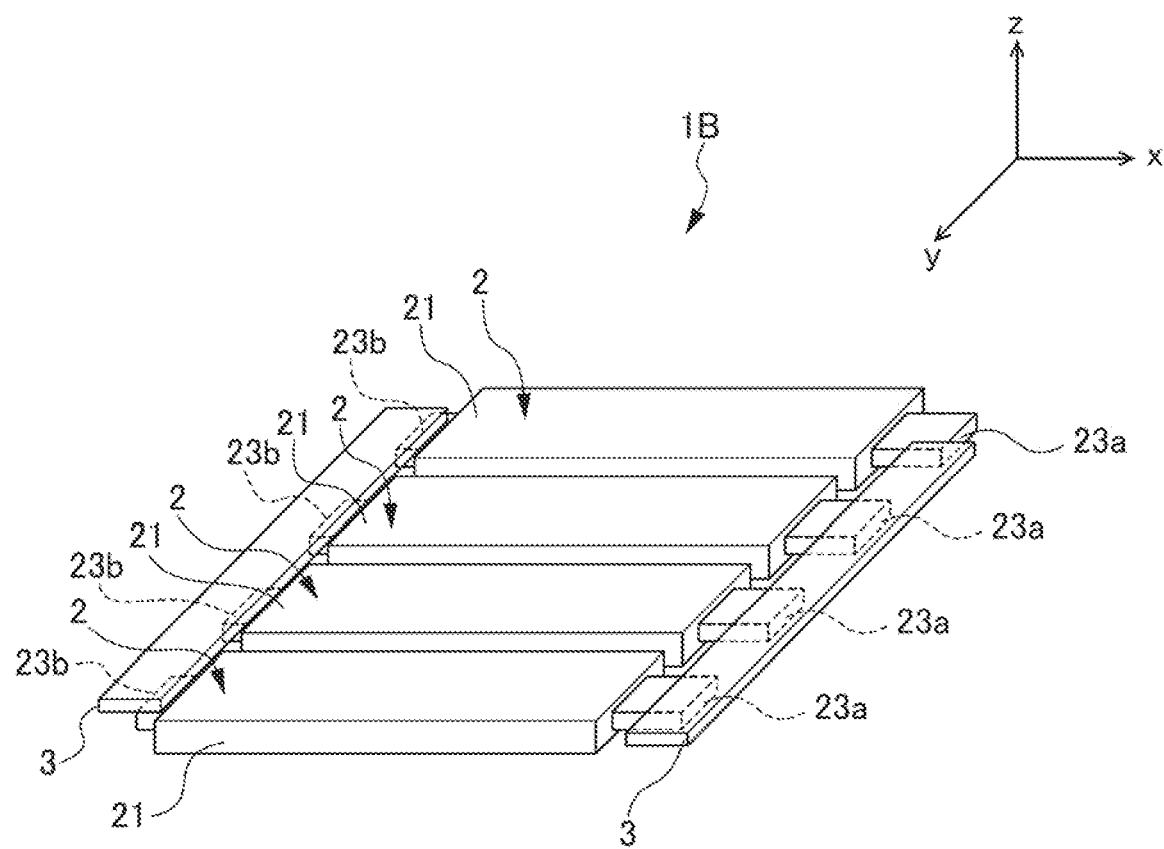
FIG. 4 is a perspective view showing the basic configuration of a battery module according to the present invention made connecting in parallel a plurality of battery cells.

The battery module is not limited to serially connecting a plurality of battery cells 2. For example, it may connect a plurality of battery cells 2 in parallel, as in the battery module 1B shown in FIG. 4. In other words, in the battery module 18 shown FIG. 4, four battery cells 2 are arranging the orientation of the positive electrode terminals 23a and orientation of the negative electrode terminals 23b all in the same direction. Therefore, in the four battery cells 2, the four positive electrode terminals 23a are arranged along the y direction at one end in the x direction, and the four negative electrode terminals 23b are arranged along the y direction at the other end in the x direction. Then, all of the positive electrode terminals 23a of the four battery cells 2 in the arrangement direction (y direction) are electrically connected by one bus bar 3, and all of the negative electrode terminals 23b are electrically connected by one bus bar 3. The battery module 1B in which a plurality of the battery cells 2 are connected in parallel in this way also has the same effects as the above-mentioned battery module 1A.

Figure 5:
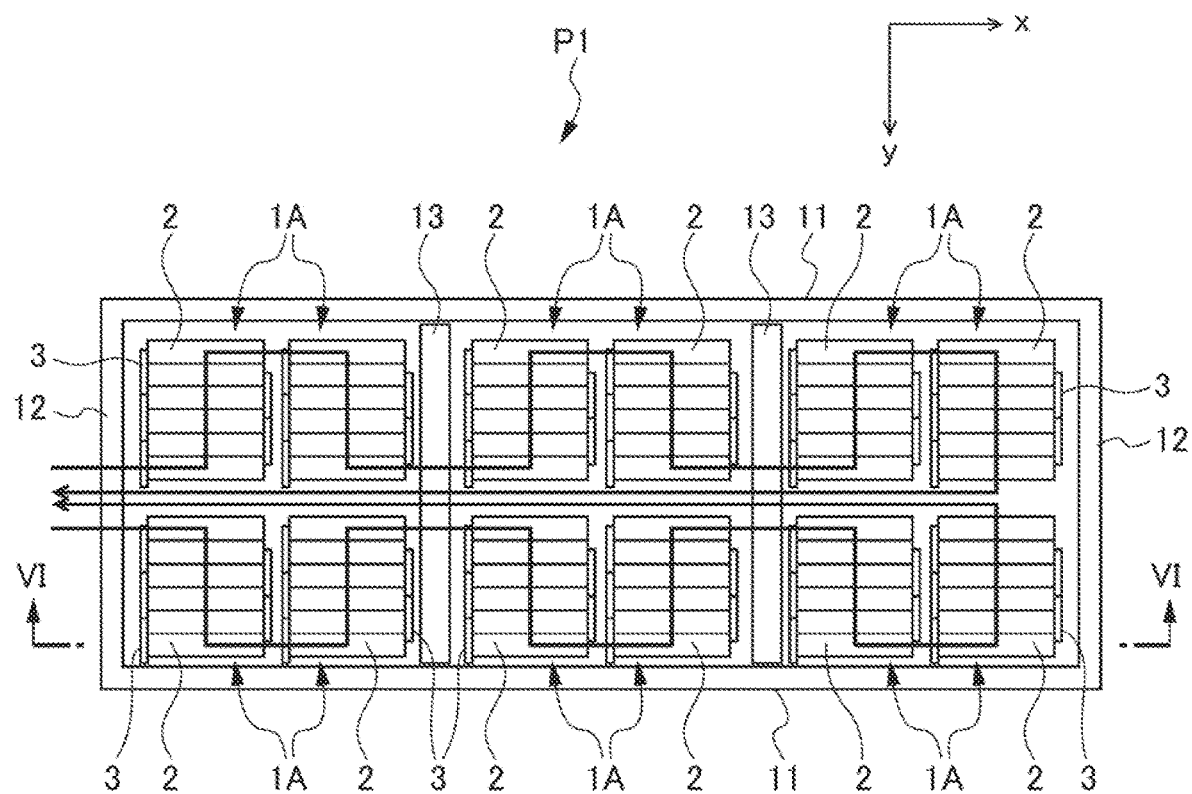
FIG. 5 is a plan view showing an embodiment of a battery pack configured by battery modules according to the present invention made by connecting in series a plurality of battery cells.
Figure 6:
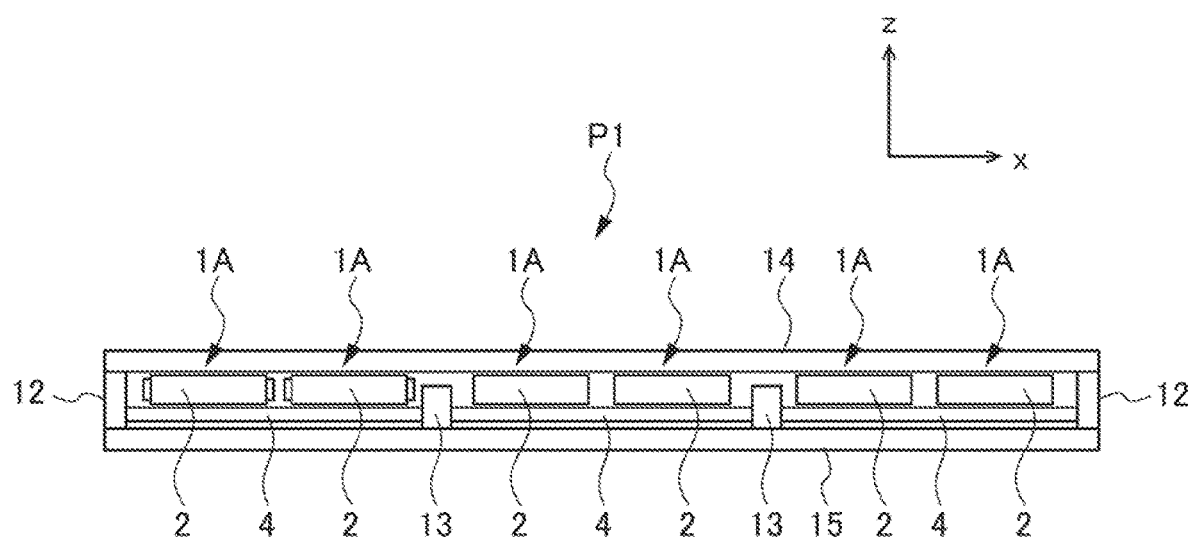
FIG. 6 is a cross-sectional view along the line VI-VI in FIG. 5.

Next, a battery pack configured by the battery modules having such a configuration will be explained. FIG. 5 shows a battery pack P1 configured using a plurality of the battery modules 1A in which a plurality of the battery cells 2 are serially connected. FIG. 6 is a cross-sectional view along the line VI-VI in FIG. 5. The battery pack P1 is framed into a rectangular shape in a plan view, by frame members 11, 12 arranged in the xy direction shown in FIG. 5. The inner side framed by the frame members 11, 12 is reinforced by two crossmembers 13, 13 arranged to span the two frame members 11, 11 extending in the x direction, and are divided into three spaces. It should be noted that the upper face and lower face of the battery pack P1 are covered by the top plate 14 and bottom plate 15, as shown in FIG. 6.

This battery pack P1 is arranged so that four battery modules 1A are arranged to orient the thickness direction of the battery cell 2 in the up/down direction (direction following z direction), in each space divided by partition members 13. In FIG. 5, each battery module 1A has six battery cells 2. The positive electrode terminal 23a and negative electrode terminal 23b of battery cells 2,2 arranged at ends in the y direction of battery modules 1A, 1A which are adjacent in the x direction of FIG. 5 are electrically connected by a harness (not illustrated) and/or bus bar. In the battery pack P1, a set of six battery modules 1A on a side along the y direction in FIG. 5 are serially connected, and a set of six battery modules 1A on the lower side are serially connected, as shown by arrows in FIG. 5.

As shown in FIG. 6, a water jacket 4 is arranged on the bottom plate 15. The water jacket 4 has a cooling medium channel (not illustrated) in which coolant or gas (air) flows, and is respectively arranged in each space divided by the partition members 13. Each battery module 1A is laminated directly, or indirectly via a sheet or the like (not illustrated) having a heat transfer property and insulation property, on the upper face of the water jacket 4. This water jacket 4 corresponds to the cooling means of the present invention. It should be noted that this water jacket 4 may be configured by the bottom plate 15.

Since this battery pack P1 is configured by arranging a plurality of the above-mentioned battery modules 1A, it is possible to suppress the height of the battery pack P1 to be low. Since the battery module 1A is configured by the battery cells 2 consisting of solid-state batteries, there is no need to consider the orientation of the battery cells as in the case of using battery cells containing electrolytic solution, and thus it is possible to improve the degrees of freedom in arrangement of the battery cells 2. Moreover, in each battery module 1A, the flat surface of the battery cells 2 (face vertical in the z direction shown in FIGS. 1 and 2) line up on the same plane, and it is possible to cool the lower face side of this battery cell 2 by the water jacket 4; therefore, it is possible to ensure a wide cooling area of each battery cell 2. Therefore, according to this battery pack P1, the cooling efficiency of each battery cell 2 improves. It should be noted that the battery pack P1 may be configured using a plurality of the battery modules 18 in which a plurality of the battery cells 2 are connected in parallel.

Figure 7:
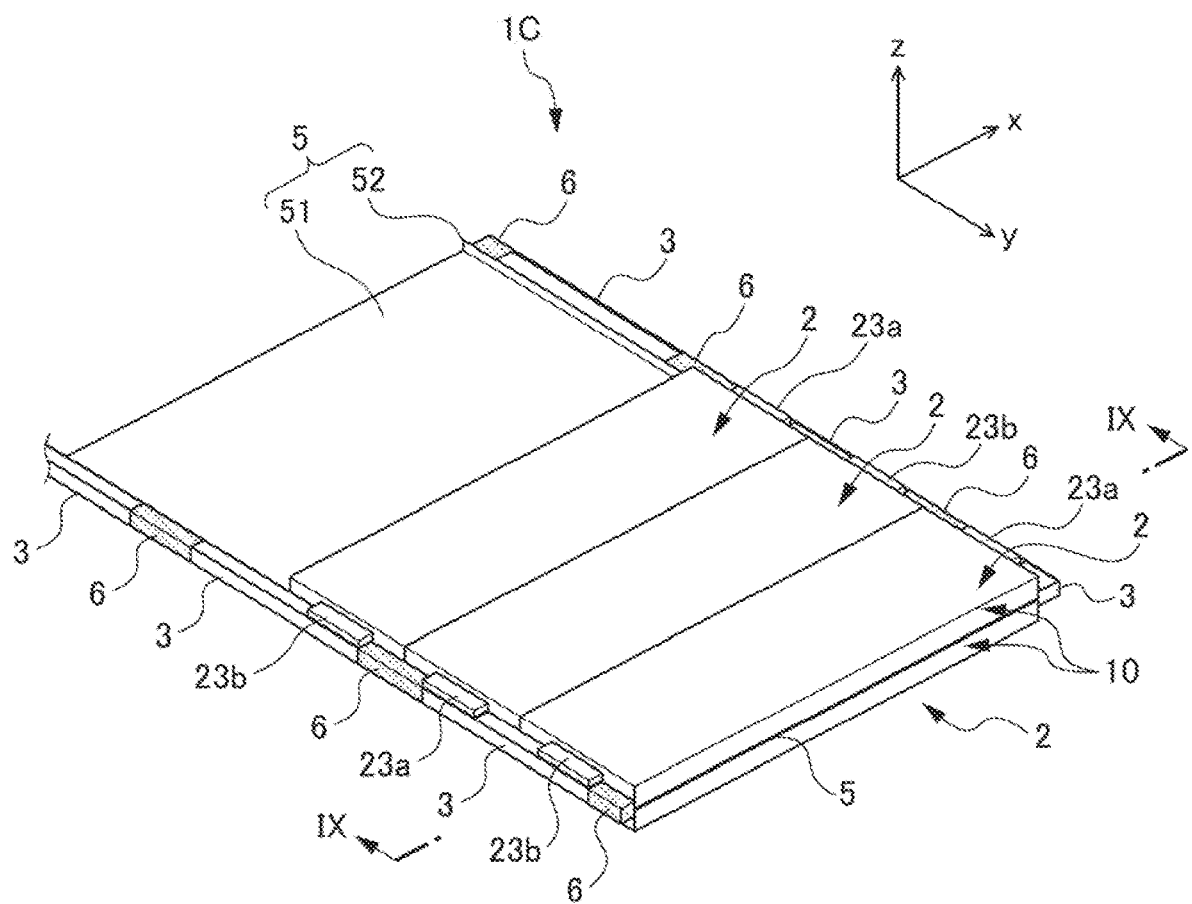
FIG. 7 is a perspective view showing a basic configuration of a battery module made by laminating battery cells in two layers in the z direction.
Figure 8:
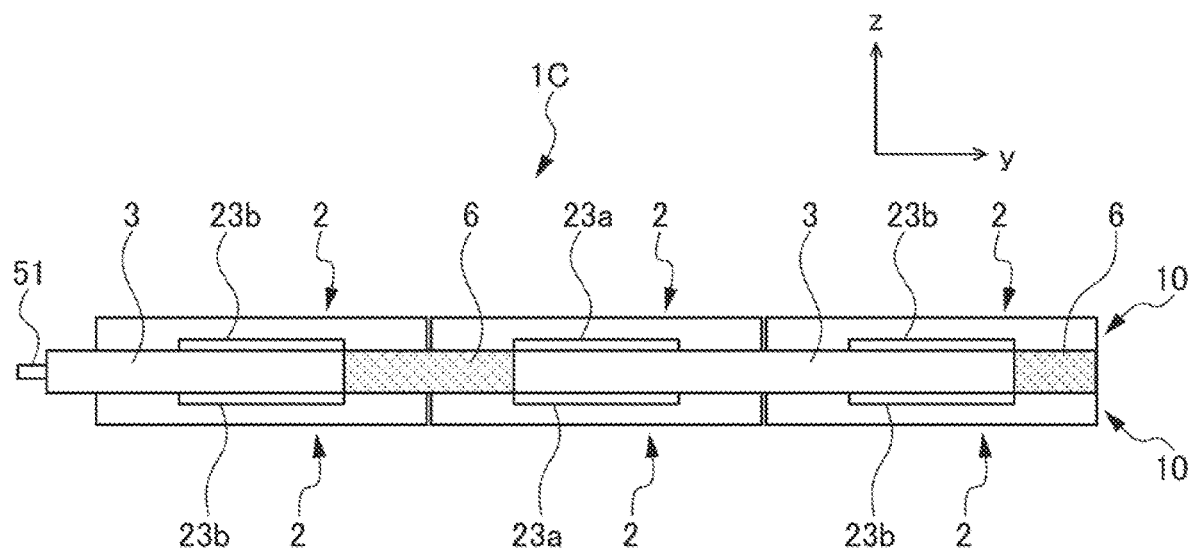
FIG. 8 is a side view looking at the battery module shown in FIG. 7 along the x direction.
Figure 9:
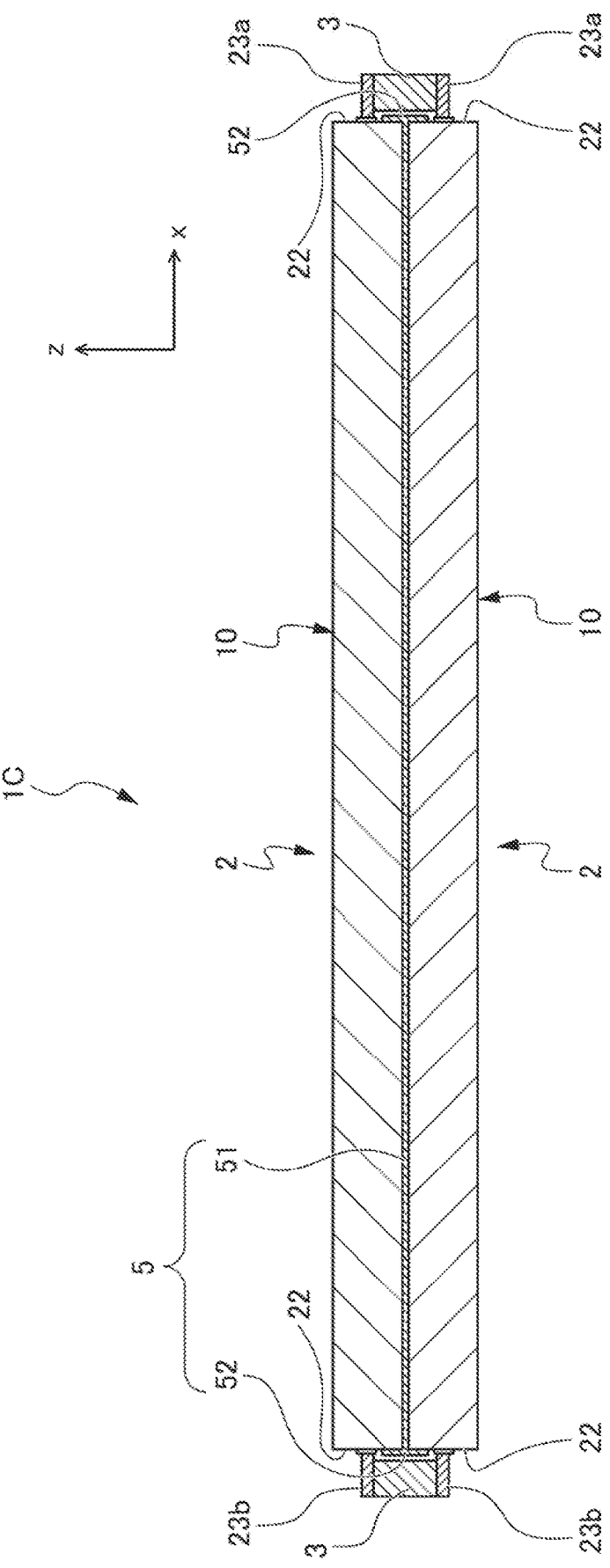
FIG. 9 is a cross-sectional view along the line IX-IX in FIG. 7.

FIGS. 7 to 9 show another embodiment for the basic configuration of the battery module. With this battery module 1C, the battery modules 1A shown in FIG. 1 are established as one module group 10, and this module group 10 has a configuration laminated in two layers in the z direction. It should be noted that, in FIG. 7, only three battery cells 2 are shown among the plurality of battery cells 2 arranged in the module group 10 of the upper layer. In the plurality of battery cells 2 of the modules groups 10, 10 of the upper layer and lower layer, the positive electrode terminal 23a and negative electrode terminal 23b are arranged to alternately line up in the y direction, similarly to the battery module 1A. The orientations of the positive electrode terminal 23a and negative electrode terminal 23b of two battery cells 2, 2 laminated above and below are aligned so as to be identical.

As shown in FIGS. 7 and 8, a separator 5 having an insulation property is interposed between the two battery cells 2, 2 which are adjacent in the lamination direction. The separator 5 has a separator main body 51 arranged between the two battery cells 2,2 which are adjacent in the lamination direction, and a bus bar abutting part 52 arranged at both ends in the X direction of this separator main body 51 so as to be orthogonal to the separator main body 51. The bus bar abutting parts 52 are provided over the lateral faces 22, 22 at which the positive electrode terminals 23a and negative electrode terminals 23b of laminated battery cells 2,2 are provided to project from the separator main body 51, as shown in FIG. 9. The bus bar abutting part 52 is arranged between the upper and lower positive electrode terminals 23a, 23a and between negative electrode terminals 23b, 23b, respectively.

The two battery cells 2, 2 laminated above and below (z direction), and two battery cells 2,2 which are adjacent in the array direction (y direction) of the battery cells 2 in the same layer are electrically connected by common bus bars 3. More specifically, the positive electrode terminals 23a, 23a or negative electrode terminals 23b, 23b of two battery cells 2, 2 which are adjacent in the lamination direction are electrically connected by one bus bar 3 arranged between the two positive electrode terminals 23a, 23a or the two negative electrode terminals 23b, 23b. For this reason, the two battery cells 2, 2 which are adjacent in the lamination direction are connected in parallel by the bus bar 3. At the same time as this, the above-mentioned bus bar 3 connecting in parallel the battery cells 2,2 which are adjacent in the lamination direction, is arranged to span the positive electrode terminal 23a and negative electrode terminal 23b of two battery cells 2,2 which are adjacent in the array direction, whereby the two battery cells 2, 2 which are adjacent in the array direction are serially connected by the above-mentioned common bus bar 3. Therefore, the one bus bar 3 is electrically connected with the positive electrode terminals 23a and negative electrode terminals 23b of a total of four battery cells 2 adjacent in the lamination direction and array direction. For this reason, it is possible to connect in parallel and series a plurality of battery cells 2 by a small number of bus bars 3. Each bus bar 3 is arranged so as to be close or abut the bus bar abutting part 52 of the separator 5, but is not directly touched to the battery cell 2.

The two bus bars 3, 3 which are adjacent in the array direction of the battery cells 2 are coupled integrally by a coupling structural member 6. The coupling structural member 6 is formed from an insulative material such as resin or ceramic, and integrally couples the two adjacent bus bars 3, 3 by adhesion or fastening by a screw or the like. The battery cells 2, 2 in the lamination direction and plurality of battery cells 2 in the array direction thereby form a structure integrally coupled by the bus bar 3 and the coupling structural member 6, and the lamination state and arranging state of each battery cell 2 comes to be retained.

With this battery module 1C, since the battery cells 2 are a flat shape, even if laminating a plurality of the battery cells 2, the height of the battery module 1C will not become extremely larger. For this reason, according to this battery module 1C, it is possible to arrange the battery cells 2 in higher density, while suppressing the height.

Figure 10:
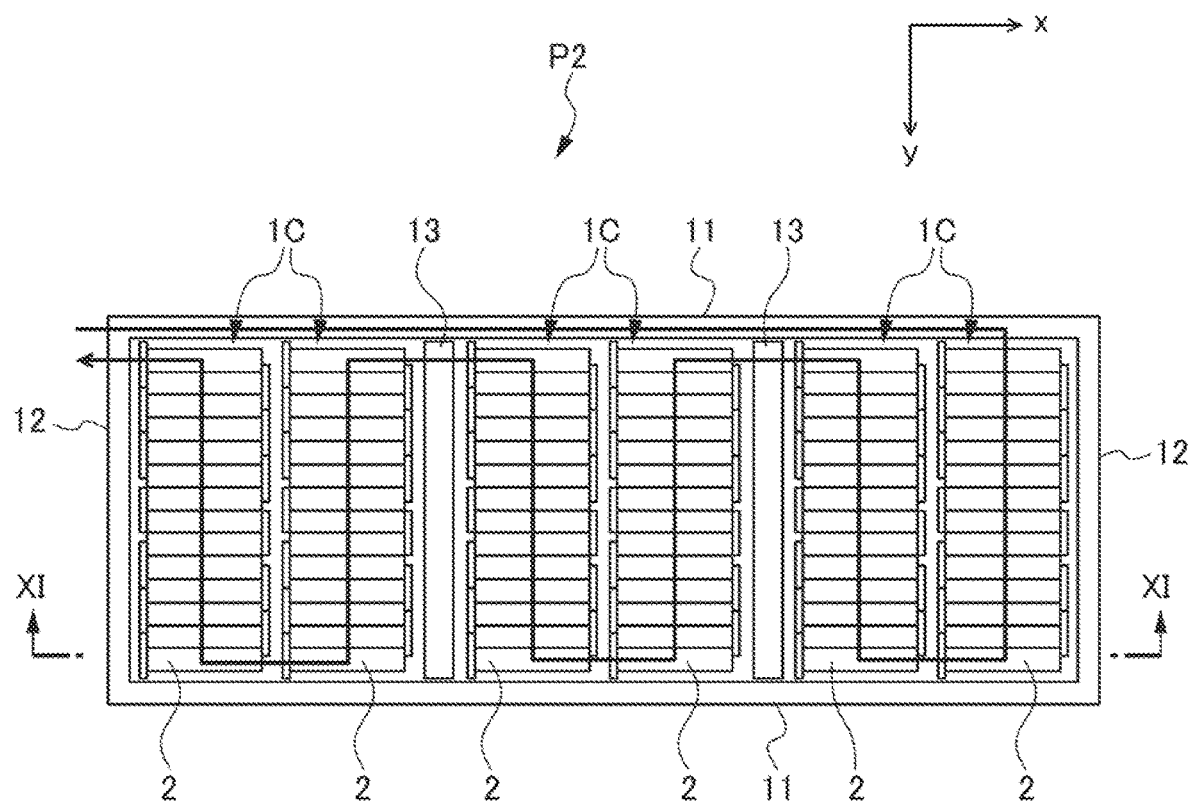
FIG. 10 is a plan view showing an embodiment of a battery pack configured by battery modules made by laminating battery cells in two layers in the z direction.
Figure 11:
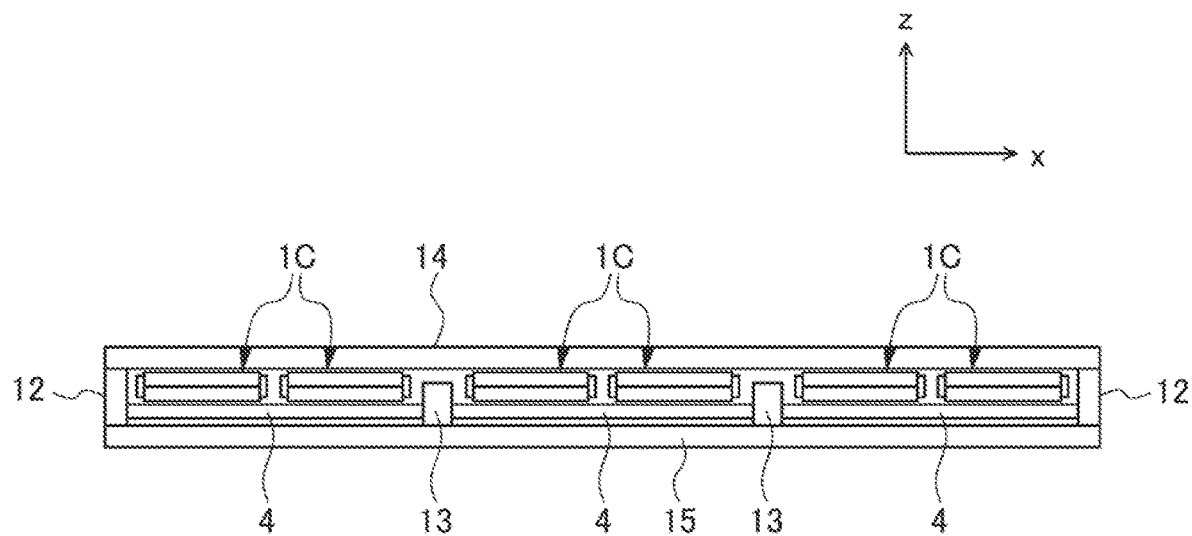
FIG. 11 is a cross-sectional view along the line XI-XI in FIG. 10.
Figure 12:
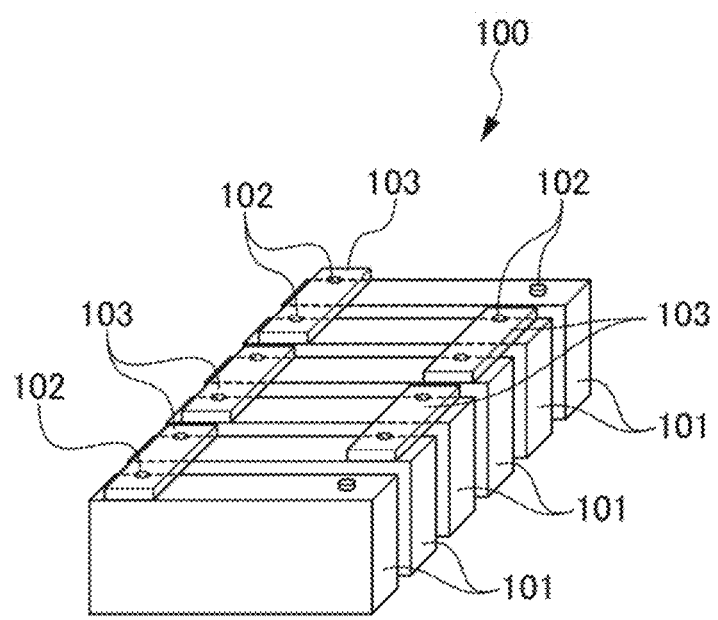
FIG. 12 is a perspective view showing an example of a conventional battery module.

FIG. 10 shows a battery pack P2 configured using a plurality of such battery modules 1C. FIG. 11 is a cross-sectional view along the line XI-XI in FIG. 10. The parts of the same reference number as the battery pack P1 shown in FIGS. 5 and 6 are parts of the same configuration; therefore, detailed explanation of these will invoke the above explanation, and will be omitted herein. In this battery pack P2, a set of two battery modules 1C is arranged in each of the three spaces divided by the crossmembers 13. Each battery module 1C is configured by a total of twenty-eight battery cells 2 having fourteen battery cells 2 per one layer. Each battery module 1C is laminated directly or indirectly via a sheet or the like (not illustrated) having a heat transfer property and insulation property, on the upper face of the water jacket 4.

The positive electrode terminal 23a and negative electrode terminal 23b of battery cells 2,2 arranged on the same end in the y direction of battery modules 1C, 1C which are adjacent in the x direction in FIG. 10 are electrically connected by a harness (not illustrated) and/or a bus bar. With the battery pack P2, a set of six battery modules 1C are serially connected, as shown by the arrows in FIG. 10.

According to this battery pack P2, in addition to having effects similar to the battery pack P1, since each battery module 1C is configured by laminating battery cells 2 in two layers, it is possible to arrange twice the battery cells 2 in high density, without extremely raising the height, relative to the same installation area as the battery pack P1.

The battery modules and battery packs according to the present invention can adopt various modifications with the scope of the technical concept of the present invention. For example, in the above embodiments, the battery cell 2 accommodates the electrode plate 20 in a cell case 21 made of metal; however, instead of using the cell case 21, the electrode plate 20 may be accommodated in a laminate pack consisting of resin film.

In addition, in the battery module A1 shown in FIG. 1, the bus bars 3, 3 which are adjacent in the array direction (y direction) of the battery cell 2 may be integrally coupled by the coupling structural member 6, similarly to FIGS. 7 to 9.

Furthermore, the positive electrode terminal 23a, negative electrode terminal 23b and bus bar 3 are not limited to being formed in a simple plate shape. The positive electrode terminal 23a, negative electrode terminal 23b and bus bar 3, although not illustrated, may have one or a plurality of ribs for strength improvement at a surface other than the electrical connection face. In particular, by providing ribs along the parallel direction of adjacent battery cells 2, 2 to the bus bar 3, since the force integrally supporting the two battery cells 2, 2 by the bus bar 3 becomes stronger by the strength improvement of the bus bar 3, the shape retention of the battery modules 1A, 1B, 1C further improves.

EXPLANATION OF REFERENCE NUMERALS 1A, 1B, 1C battery module
2 battery cell
22 lateral face (opposing battery cell)
23a positive electrode terminal (electrode terminal)
23b negative electrode terminal (electrode terminal).
201 positive electrode layer
202 negative electrode layer
203 solid electrolyte layer
3 bus bar
4 water jacket (cooling means)
5 separator
51 separator main body
52 bus bar abutting part
6 coupling structural member
10 module group
11, 12 frame member
13 crossmember
14 top plate
15 bottom plate
P1, P2 battery pack

The invention claimed is:
1. A battery module comprising
a plurality of battery cells consisting of a solid-state battery in which a positive electrode layer, a negative electrode layer and solid electrolyte layer are laminated,
wherein the plurality of battery cells each have a pair of electrode terminals which respectively protrude from opposing lateral faces of the plurality of battery cells,
wherein the plurality of the battery cells are parallel relative to lamination planes of the positive electrode layer, the negative electrode layer and the solid electrolyte layer, and arranged so that the electrode terminals of different battery cells of the plurality of battery cells are lined up, and
wherein the electrode terminals of the plurality of battery cells which are adjacent in an array direction are electrically connected by bus bars, and the bus bars which are adjacent in the array direction of the plurality of battery cells are integrally coupled by a coupling structural member having an insulation property,
wherein a module group configured by the plurality of the battery cells being arranged is laminated in plurality in a direction orthogonal to the lamination plane,
wherein the bus bars are each disposed between the electrode terminals of the plurality of battery cells which are adjacent in the lamination direction, the plurality of battery cells which are adjacent in the lamination direction are connected in parallel by the bus bars, and the electrode terminals of the plurality of battery cells which are adjacent in the array direction in the module group are connected in series by the bus bars which are common electrically connecting the plurality of battery cells which are adjacent in the lamination direction,
wherein a separator having an insulation property is interposed between the plurality of battery cells which are adjacent in the lamination direction,
wherein the separator includes: a separator main body disposed between the plurality of battery cells which are adjacent in the lamination direction, and a bus bar abutting part disposed at both ends of the separator main body so as to be orthogonal to the separator main body, wherein the bus bar abutting part is disposed at a lateral face at which the electrode terminal of the plurality of battery cells which are laminated is provided to project, and wherein the bus bar is disposed so as to be close or abut the bus bar abutting part.

2. The battery module according to claim 1, wherein the electrode terminals are each formed in a flat plate shape which is parallel relative to the lamination plane.

3. The battery module according to claim 2, wherein the bus bars are each formed in a flat plate shape which is parallel relative to the electrode terminal.

4. A battery pack comprising a plurality of the battery modules according to claim 1 disposed in parallel relative to an array direction of the plurality of battery cells.

5. The battery pack according to claim 4, further comprising a cooling medium channel which cools each of the plurality of battery cells, in a lower surface side of the plurality of battery modules.

6. A battery module comprising a plurality of battery cells consisting of a solid-state battery in which a positive electrode layer, a negative electrode layer and solid electrolyte layer are laminated, wherein the plurality of battery cells each have a pair of electrode terminals which respectively protrude from opposing lateral faces of the plurality of battery cells, wherein the plurality of the battery cells are parallel relative to lamination planes of the positive electrode layer, the negative electrode layer and the solid electrolyte layer, and arranged so that the electrode terminals of different battery cells of the plurality of battery cells are lined up, and wherein the electrode terminals of the plurality of battery cells which are adjacent in an array direction are electrically connected by bus bars, and coupling structural members each having an insulation property are integrally coupled between opposing end faces of the plurality of bus bars which are adjacent in the array direction of the plurality of battery cells.

* * * * *